United States Patent [19]

Iverson et al.

[11] Patent Number: 5,524,917
[45] Date of Patent: Jun. 11, 1996

[54] LIGHTWEIGHT SNOWPLOW DOLLY

[76] Inventors: Leroy P. Iverson; Gloria M. Iverson, both of 9369 190th St., Milaca, Minn. 56353

[21] Appl. No.: 285,097

[22] Filed: Aug. 3, 1994

[51] Int. Cl.⁶ ............................................. B62B 3/12
[52] U.S. Cl. ........................................ 280/62; 280/79.11
[58] Field of Search ...................... 280/79.11, 79.2, 280/79.3, 79.7, 47.34, 47.35, 62, 35, 32.5, 32.7

[56] References Cited

U.S. PATENT DOCUMENTS

| | | | |
|---|---|---|---|
| 2,663,134 | 12/1953 | Bodine | 280/79.3 |
| 3,838,779 | 10/1974 | Dawson | 280/62 |
| 4,346,906 | 8/1982 | Thorpe | 280/79.3 |
| 4,572,531 | 2/1986 | Elia | 280/79.11 |
| 4,640,521 | 2/1987 | Berfield | 280/47.34 |
| 4,821,435 | 4/1989 | Pester | 280/79.11 |
| 5,050,898 | 9/1991 | Petrell | 280/79.3 |
| 5,123,797 | 6/1992 | Schnelle et al. | 280/79.11 |
| 5,433,460 | 7/1995 | Young | 280/79.7 |

*Primary Examiner*—Anne Marie Boehler

[57] ABSTRACT

Disclosed is a new lightweight snowplow dolly for aiding in removing and attaching a lightweight pickup truck-type snowplow blade assembly and also moving and storing the removed blade assembly. The lightweight snowplow dolly comprises a generally horizontal trapezoidal frame structure formed of side, front, and rear tubular steel members. The front member is longer than the rear member for supporting a plow blade whereas the rear member is spaced from the front member for supporting a plow frame. A downwardly depending fixed caster wheel assembly is mounted to the front member proximal each end thereof and a downwardly depending swivel caster wheel assembly is centrally mounted to the rear member. An upwardly projecting guide post is integrally mounted proximal each end of the front member whereby a plow vehicle operator may align the plow blade when positioning the plow assembly on the frame prior to removal from a vehicle. The guide post also provides a stop member for abutment against the plow blade whereby alignment is facilitated.

14 Claims, 5 Drawing Sheets

LIGHTWEIGHT SNOWPLOW DOLLY

BACKGROUND OF THE INVENTION

1. Field of the Invention

The present invention relates to snowplows and more particularly pertains to a lightweight snowplow dolly which may be adapted for aiding in removing and attaching a lightweight pickup truck-type snowplow blade assembly and also moving and storing the removed blade assembly by using a carrier frame supported on caster wheels.

2. Description of the Prior Art

The use of snowplow dollies is known in the prior art. More specifically, snowplow dollies heretofore devised and utilized for the purpose of carrying snowplow blade assemblies when detached from the plowing vehicle are known to consist basically of familiar, expected and obvious structural configurations, notwithstanding the myriad of designs encompassed by the crowded prior art which have been developed for the fulfillment of countless objectives and requirements.

The present invention is directed to improving devices for carrying snowplow blade assemblies when detached from the plowing vehicle in a manner which is safe, secure, economical and aesthetically pleasing.

U.S. Pat. No. 4,821,435 to Pester describes a snow plow alignment and storage system having a wheeled carrier with a frame supported on caster wheels. The invention disclosed has a disadvantage in that its small size may make it unstable when handling wide and heavy plow assemblies.

The prior art also discloses wheeled carrier for a snow plow as shown in U.S. Pat. No. 4,887,838 to Reppen, a snow plow dolly in U.S. Pat. No. 4,572,531 to Elia, and a plow dolly of U.S. Pat. No. 3,941,400 to Buttner. All three of these devices may be difficult to operate because of inadequate or nonexistent plow blade guide/stop members.

Another relevant patent is U.S. Pat. No. 5,050,898 to Petrell, Jr. which discloses a mobile platform for a snow plow. While this device fulfills its particular objectives and requirements, the aforementioned patent discloses a rather complex apparatus having a high cost to produce and market.

In this respect, the lightweight snowplow dolly according to the present invention substantially departs from the conventional concepts and designs of the prior art, and in so doing provides an apparatus primarily developed for the purpose of aiding in removing and attaching a lightweight pickup truck-type snowplow blade assembly and also moving and storing the removed blade assembly.

Therefore, it can be appreciated that there exists a continuing need for a new lightweight snowplow dolly which can be used for aiding in removing and attaching a lightweight pickup truck-type snowplow blade assembly and also moving and storing the removed blade assembly by using a carrier frame supported on caster wheels. In this regard, the present invention substantially fulfills this need.

As illustrated by the background art, efforts are continuously being made in an attempt to develop devices for carrying snowplow blade assemblies when detached from the plowing vehicle. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of snowplow dollies now present in the prior art, the present invention provides a new snowplow dolly construction wherein the same can be utilized for aiding in removing and attaching a lightweight pickup truck-type snowplow blade assembly and also moving and storing the removed blade assembly by using a carrier frame supported on caster wheels. As such, the general purpose of the present invention, which will be described subsequently in greater detail, is to provide a new lightweight snowplow dolly apparatus and method which has all the advantages of the prior art snowplows and none of the disadvantages.

The invention is defined by the appended claims with the specific embodiment shown in the attached drawings. For the purpose of summarizing the invention, the invention may be incorporated into a new lightweight snowplow dolly for aiding in removing and attaching a lightweight pickup truck-type snowplow blade assembly and also moving and storing the removed blade assembly by using a carrier frame supported on caster wheels. The lightweight snowplow dolly comprises a generally horizontal trapezoidal frame structure formed of integrally connected together side, front, and rear tubular steel members. The front member is longer than the rear member for supporting a plow blade transversely positioned on the dolly. The rear member is spaced from the front member for supporting a plow frame.

A swivel caster wheel mounting arm comprises a cantilevered steel arm integrally connected intermediate the ends of the rear member such that the arm projects perpendicularly from the rear member toward the front member.

A downwardly depending fixed caster wheel assembly is mounted to the front member proximal each end thereof. Each fixed caster wheel assembly comprises an inverted U-shaped bracket fixedly connected to the frame member. The bracket has an opposing pair of lateral through holes formed proximal the end of each vertical leg. A hard rubber wheel has a central axle hole therethrough. An axle extends through the axle hole, each end of the axle being journalled within the opposing bracket holes.

A downwardly depending swivel caster wheel assembly is mounted proximal the free end of the mounting arm. The swivel caster wheel assembly comprises an inverted U-shaped bracket swiveledly connected to the arm. The bracket has an opposing pair of lateral through holes formed proximal the end of each vertical leg thereof. A hard rubber wheel has a central axle hole therethrough. An axle extends through the axle hole, each end of the axle being journalled within the opposing bracket holes.

An upwardly projecting generally vertical guide post is integrally mounted proximal each end of the front member whereby a plow vehicle operator may align the plow blade when positioning the plow assembly on the frame prior to removal from a vehicle. The guide post also provides a stop member for abutment against the plow blade whereby alignment is facilitated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an lightweight snowplow dolly for aiding in removing and attaching a lightweight pickup truck-type snowplow blade assembly by a single person.

It is another object of the present invention to provide a new lightweight snowplow dolly which may be easily and efficiently manufactured and marketed.

It is a further object of the present invention to provide a new lightweight snowplow dolly which is of a durable and reliable construction.

An even further object of the present invention is to provide a new lightweight snowplow dolly which is susceptible of a low cost of manufacture with regard to both materials and labor, and which accordingly is then susceptible of low prices of sale to the consuming public, thereby making such lightweight snowplow dollies economically available to the buying public.

Still yet another object of the present invention is to provide a new lightweight snowplow dolly which provides in the apparatuses and methods of the prior art some of the advantages thereof, while simultaneously overcoming some of the disadvantages normally associated therewith.

Still yet another object of the present invention is to provide a new lightweight snowplow dolly for moving and storing the removed blade assembly by a single person.

Yet another object of the present invention is to provide a new lightweight snowplow dolly that has an inherently low failure rate due to use of very few moving parts.

Even still another object of the present invention is to provide a new lightweight snowplow dolly that protects the floor or other supporting surface from damage caused by plow blade contact.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 7:
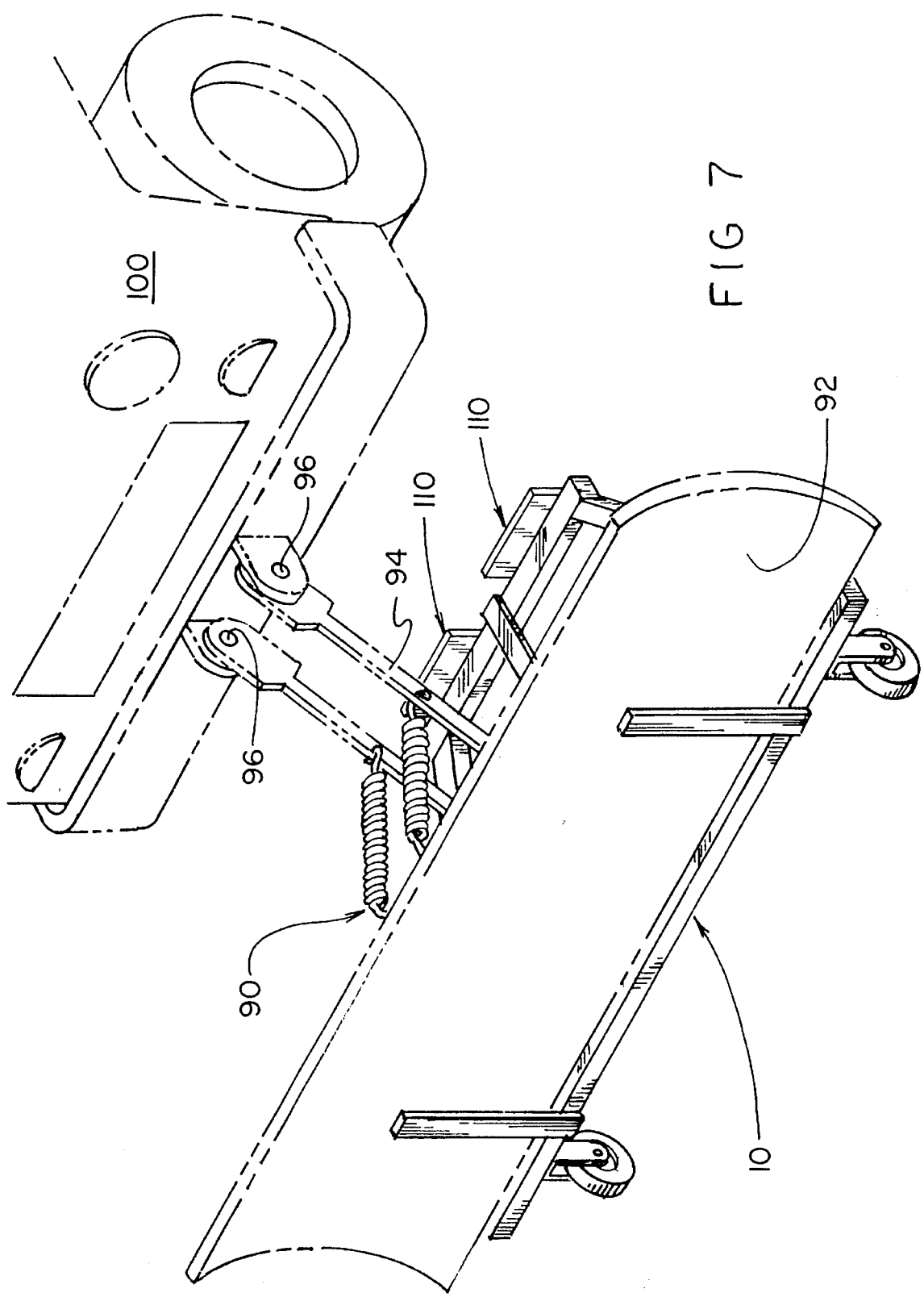
FIG. 7 is a top perspective view of the present invention showing its manner of use.

With reference now to the drawings, and in particular to FIG. 7 thereof, a new lightweight snowplow dolly embodying the principles and concepts of the present invention and generally designated by the reference numeral 10 will be described.

From an overview standpoint, the lightweight snowplow dolly is adapted for use for aiding in removing and attaching a lightweight pickup truck-type snowplow blade assembly and also moving and storing the removed blade assembly by using a carrier frame supported on caster wheels. See FIG. 7.

With reference now to FIGS. 3–8 and more specifically, it will be noted that a new lightweight snowplow dolly 10 is shown. The lightweight snowplow dolly 10 comprises a generally horizontal trapezoidal frame structure 20 formed of integrally connected together side, front, and rear 2 inch square tubular steel members 26, 28, 22, and 24 respectively. The front member 22 is 72 inches long for supporting a plow blade 92 transversely positioned on the dolly 10. The 30 inch long rear member 24 is spaced from the front member 22 with the 30 inch long side members 26 and 28 for supporting a plow frame 94 after removal of the connecting pins 96.

A swivel caster wheel mounting arm comprises a 2 inch wide cantilevered steel arm 36 integrally connected intermediate the ends of the rear member 24 such that the arm 36 projects perpendicularly 6 inches from the rear member 24 toward the front member 22.

A downwardly depending fixed caster wheel assembly 40 is mounted to the front member 8 inches from each end thereof. Each fixed caster wheel assembly 40 comprises an inverted U-shaped bracket 44 fixedly connected to the frame member 22. The bracket 44 has an opposing pair of lateral through holes 48 formed proximal the end of each vertical leg. A 6 inch diameter hard rubber wheel 42 has a central axle hole therethrough. An axle 46 extends through the axle hole, each end of the axle being journalled within the opposing bracket holes 48.

A downwardly depending swivel caster wheel assembly 50 is mounted proximal the free end of the mounting arm 36. The swivel caster wheel assembly 50 comprises an inverted U-shaped bracket 54 connected to the arm 36 with a swivel assembly 58. The bracket 54 has an opposing pair of lateral through holes 62 formed proximal the end of each vertical leg thereof. A 6 inch diameter hard rubber wheel 52 has a central axle hole therethrough. An axle 56 extends through the axle hole, each end of the axle 56 being journalled within the opposing bracket holes 62.

An upwardly projecting generally vertical 18 inch high guide post 32 is integrally mounted 12 inches from each end of the front member 22 whereby a plow vehicle operator may align the plow blade 92 when positioning the plow assembly 90 on the dolly 10 prior to removal from a vehicle 100. The guide posts 32 also provide a stop member for abutment against the plow blade 92 whereby alignment is facilitated.

Figure 1:
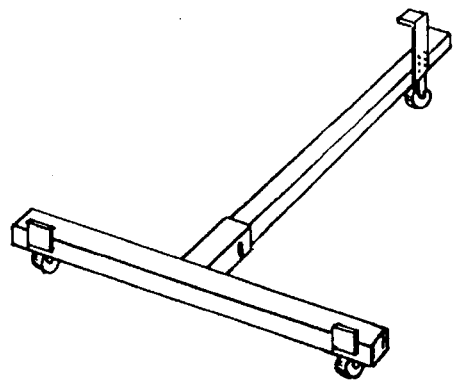
FIG. 1 is a perspective view of a prior art T-shaped snowplow dolly.
Figure 2:
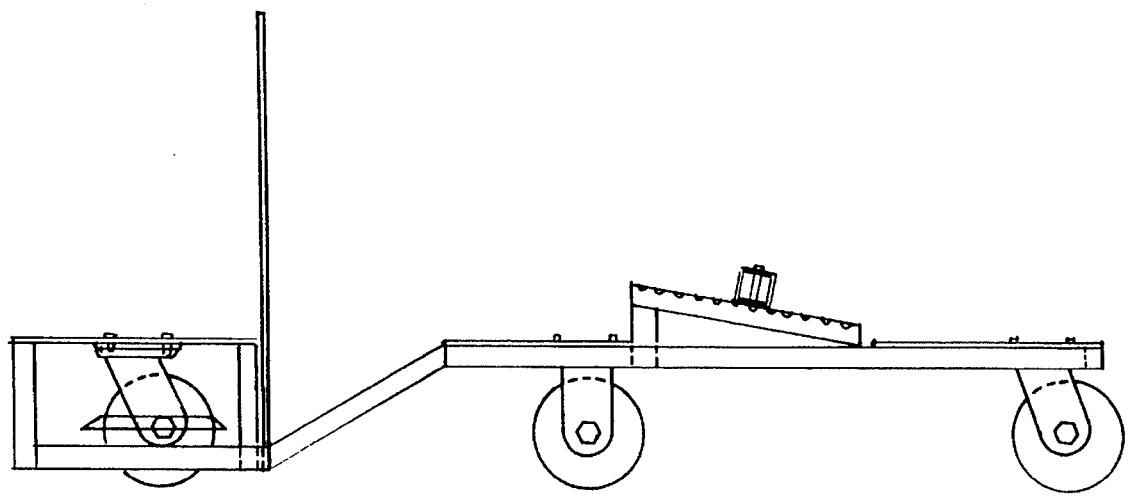
FIG. 2 is a side elevational view of a prior art mobile platform for a snow plow.
Figure 3:
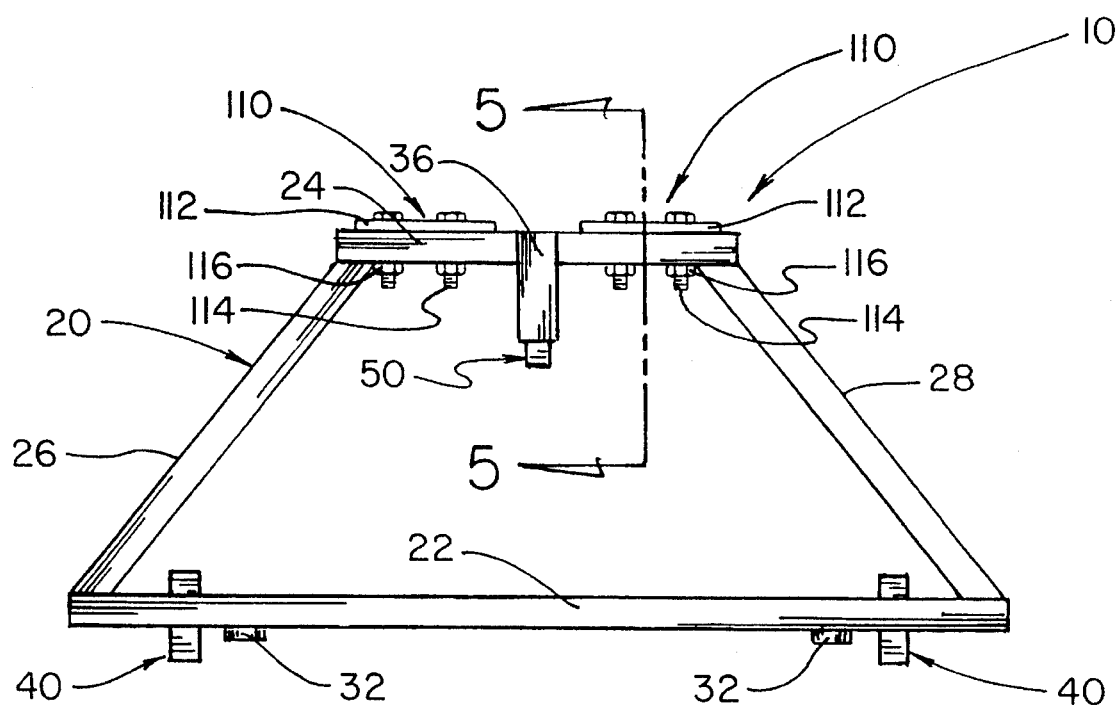
FIG. 3 is a top plan view of the preferred embodiment of the present invention lightweight snowplow dolly.
Figure 4:
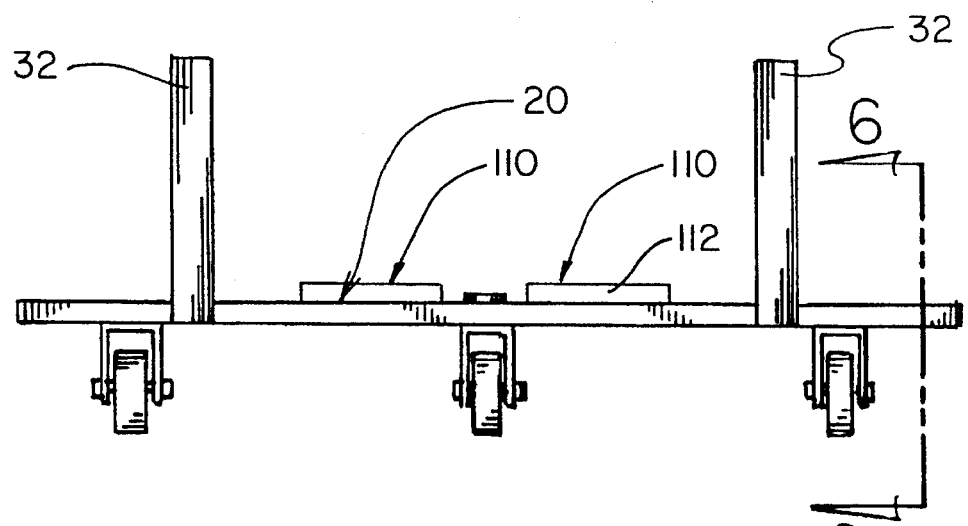
FIG. 4 is a front elevational view of the invention of FIG. 3.
Figure 5:
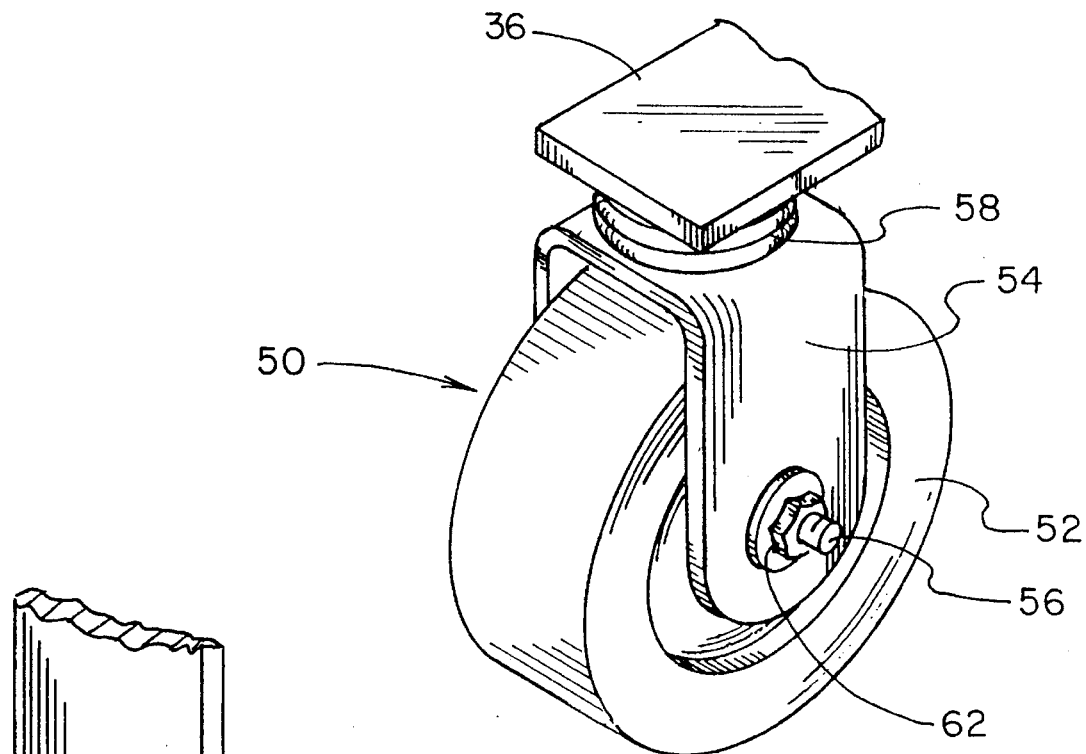
FIG. 5 is a partial top perspective view of the present invention detailing the swivel caster and its manner of attachment.
Figure 6:
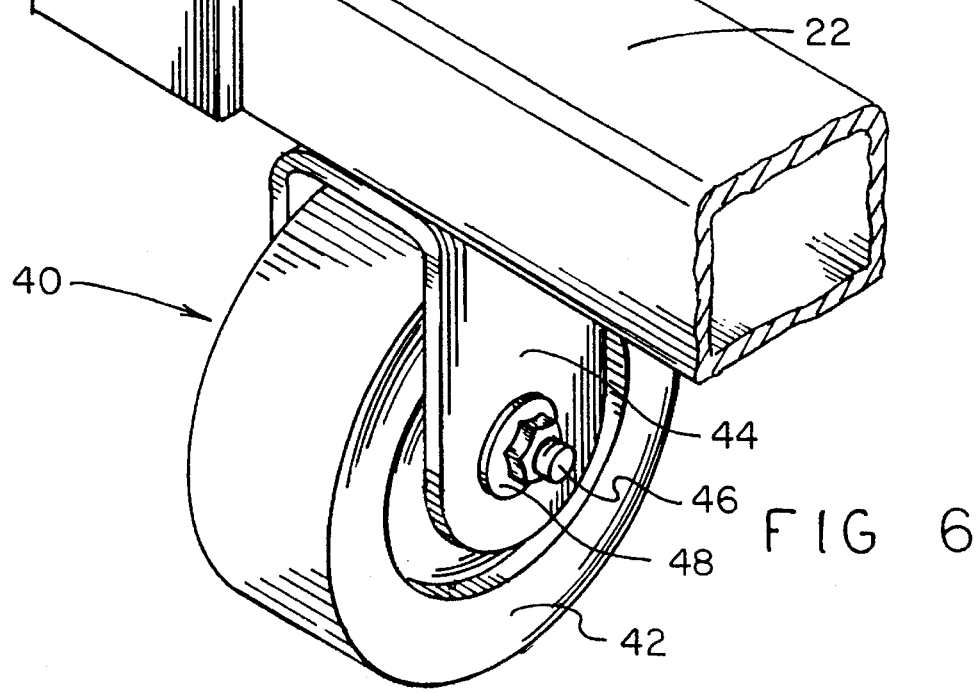
FIG. 6 is a partial top perspective view of the present invention detailing one of the two fixed casters and its manner of attachment.
Figure 8:
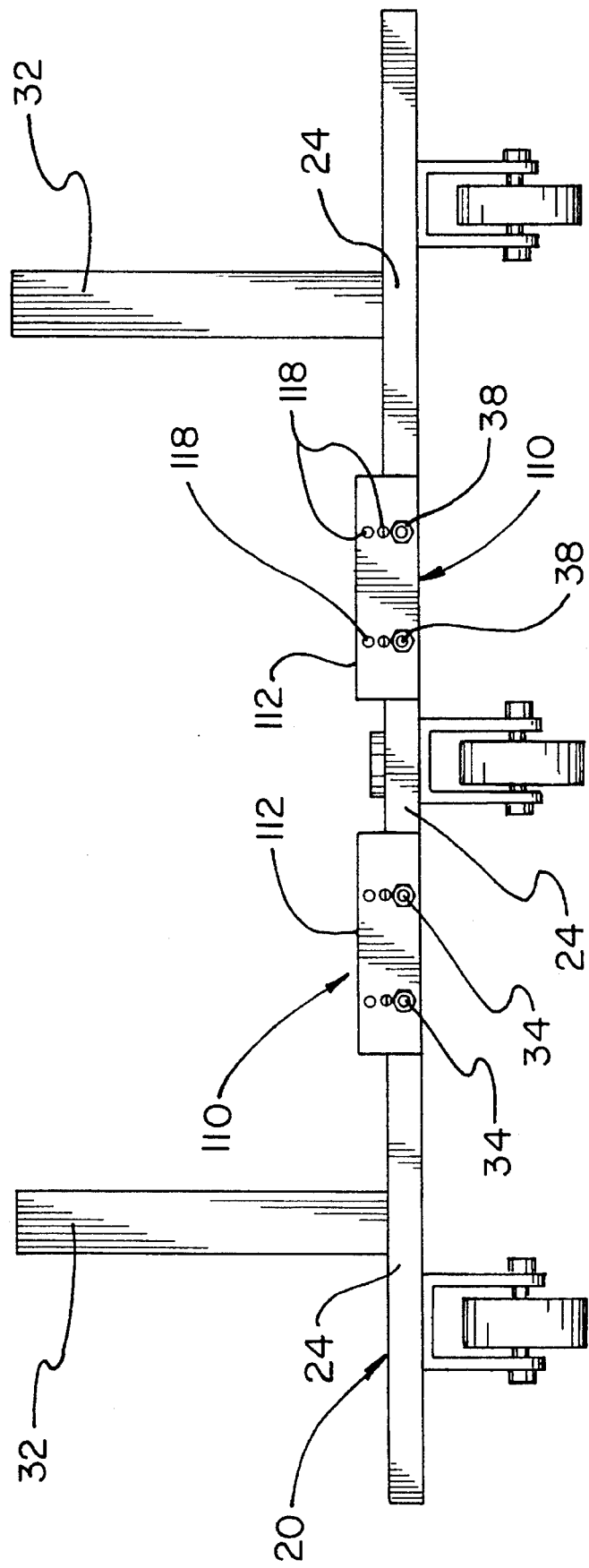
FIG. 8 is a rear elevational view of the invention of FIG. 3.

The lightweight snowplow dolly 10 further includes adjustable plow frame support means 110, best shown in FIGS. 3 and 8, whereby the frame 94 of the detached snowplow may be adjustably supported at the height of a pickup truck snowplow connecting pins 96 for facilitating reattachment of the snowplow to the pickup truck. The adjustable plow frame support means 110 comprises a pair of longitudinally spaced apart lateral holes 34 and 38 through the rear frame member 24 proximal each end thereof.

A rectangular steel support plate 112 lies in parallel touching relationship with a rear edge of the rear frame member 24 proximal each end thereof. Each plate 112 has three vertically spaced apart pairs of longitudinally spaced apart holes 118 therethrough. Each of the pairs of holes 118 through each of the plates 112 may be aligned with the pair of holes 34 and 38 proximal each end of the rear frame member 24.

A bolt 114 extends through each of the aligned holes 34 and 118 (and 38 and 118) through the support plates 112 and the rear frame member 24. Each bolt 114 is removably secured with a nut 116 whereby each support plate 110 may be adjusted vertically to support the snowplow frame 94 upon an upwardly extending edge of the plate 112 at any of three heights to align with a specific pickup truck plow connecting pin 96.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A lightweight snowplow dolly for aiding in removing and attaching a lightweight pickup truck snowplow blade assembly and also moving and storing the removed blade assembly by using a carrier frame supported on caster wheels, the lightweight snowplow dolly comprising:

a generally horizontal trapezoidal frame structure formed of integrally connected together side, front, and rear tubular steel members, the front member being longer than the rear member for supporting a plow blade transversely positioned on the dolly, the rear member being spaced from the front member for supporting a plow frame;

a swivel caster wheel mounting arm comprising a cantilevered steel arm integrally connected intermediate the ends of the rear member such that the arm projects perpendicularly from the rear member toward the front member;

a downwardly depending fixed caster wheel assembly mounted to the front member proximal each end thereof, each fixed caster wheel assembly comprising an inverted U-shaped bracket fixedly connected to the front frame member, the bracket having an opposing pair of lateral through holes formed proximal the end of each vertical leg thereof, a hard rubber wheel having a central axle hole therethrough, and an axle extending through the axle hole, each end of the axle being journalled within the opposing bracket holes;

a downwardly depending swivel caster, wheel assembly mounted proximal the free end of the mounting arm, the swivel caster wheel assembly comprising an inverted U-shaped bracket swiveledly connected to the mounting arm, the bracket having an opposing pair of lateral through holes formed proximal the end of each vertical leg thereof, a hard rubber wheel having a central axle hole therethrough, and an axle extending through the axle hole, each end of the axle being journalled within the opposing bracket holes; and an upwardly projecting generally vertical guide post integrally mounted proximal each end of the front member whereby a plow vehicle operator may align the plow blade when positioning the plow assembly on the frame prior to removal from a vehicle, the guide post also providing a stop member for abutment against the plow blade whereby alignment is facilitated.

2. The lightweight snowplow dolly of claim 1 wherein the tubular members are 2 inches square.

3. The lightweight snowplow dolly of claim 2 wherein the front member is 72 inches long.

4. The lightweight snowplow dolly of claim 3 wherein the rear member is 30 inches long.

5. The lightweight snowplow dolly of claim 4 wherein both side members are 30 inches long.

6. The lightweight snowplow dolly of claim 5 wherein the cantilevered steel arm is 2 inches wide and projects 6 inches from the rear member.

7. The lightweight snowplow dolly of claim 6 wherein the caster wheels are 6 inches in diameter.

8. The lightweight snowplow dolly of claim 7 wherein the guide posts are 18 inches high.

9. The lightweight snowplow dolly of claim 8 wherein each fixed caster wheel assembly is mounted inwardly 8 inches from each end of the front member.

10. The lightweight snowplow dolly of claim 9 wherein each guide post is mounted inwardly 12 inches from each end of the front member.

11. The lightweight snowplow dolly of claim 10 and further including adjustable plow frame support means whereby the frame of the detached snowplow may be adjustably supported at the height of a pickup truck snowplow connection for facilitating reattachment of the snowplow to the pickup truck, the adjustable plow frame support means comprising a pair of longitudinally spaced apart lateral holes through the rear frame member proximal each end thereof; a rectangular steel support plate lying in parallel touching relationship with a rear edge of the rear frame member proximal each end thereof, each plate having a plurality of vertically spaced apart pairs of longitudinally spaced apart holes therethrough, each of the plurality of pairs of holes through each of the plates may be aligned with the pair of holes proximal each end of the rear frame member; and a bolt extending through each of the aligned holes through the support plates and the rear frame member, each bolt being removably secured with a nut whereby each support plate may be adjusted vertically to support the snowplow frame upon an upwardly extending edge of the plate at a height to align with a specific pickup truck plow connection.

12. The lightweight snowplow dolly of claim 11 wherein each support plate has a length of 12 inches and a width of 4 inches.

13. The lightweight snowplow dolly of claim 12 wherein each support plate has three vertically spaced apart pairs of longitudinally spaced apart holes therethrough whereby providing three adjustment heights.

14. A lightweight snowplow dolly for aiding in removing and attaching a lightweight pickup truck snowplow blade assembly and also moving and storing the removed blade assembly by using a carrier frame supported on caster wheels, the lightweight snowplow dolly comprising:

a generally horizontal frame structure formed of integrally connected together side, front, and rear members, the front member being longer than the rear member for supporting a plow blade transversely positioned on the dolly, the rear member being spaced from the front member for supporting a plow frame, the frame structure is trapezoidal when viewed from the top, the frame members are formed of 2 inch square steel tubing;

a downwardly depending fixed caster wheel assembly mounted to the front member proximal each end thereof, each fixed caster wheel assembly comprises an inverted U-shaped bracket fixedly connected to the front member, the bracket having an opposing pair of lateral through holes formed proximal the end of each vertical leg thereof, a hard rubber wheel having a central axle hole therethrough, and an axle extending through the axle hole, each end of the axle being journalled within the opposing bracket holes;

a downwardly depending swivel caster wheel assembly centrally mounted to the rear member, the swivel caster wheel assembly comprises an inverted U-shaped bracket swiveledly connected to the rear member, the bracket having an opposing pair of lateral through holes formed proximal the end of each vertical leg thereof, a hard rubber wheel having a central axle hole therethrough, and an axle extending through the axle hole, each end of the axle being journalled within the opposing bracket holes;

guide means whereby a plow vehicle operator may align the plow blade when positioning the plow assembly on the frame prior to removal from a vehicle, the guides means comprises an upwardly projecting generally vertical guide post integrally mounted proximal each end of the front member;

an adjustable plow frame support means whereby the frame of the detached snowplow may be adjustably supported at the height of a pickup truck snowplow connection for facilitating reattachment of the snowplow to the pickup truck, the adjustable plow frame support means comprising a pair of longitudinally spaced apart lateral holes through the rear frame member proximal each end thereof;

a rectangular steel support plate lying in parallel touching relationship with a rear edge of the rear frame member proximal each end thereof, each support plate having a plurality of vertically spaced apart pairs of longitudinally spaced apart holes therethrough for providing three adjustment heights, each of the plurality of pairs of holes through each of the plates may be aligned with the pair of holes proximal each end of the rear frame member, each support plate has a length of 12 inches and a width of 4 inches; and a bolt extending through each of the aligned holes through the support plates and the rear frame member, each bolt being removably secured with a nut whereby each support plate may be adjusted vertically to support the snowplow frame upon an upwardly extending edge of the plate at a height to align with a specific pickup truck plow connection.

* * * * *